Feb. 1, 1966
G. CAPPA ETAL
3,232,331
BEADS OF PNEUMATIC TIRES FOR VEHICLE WHEELS
Filed May 1, 1964
2 Sheets-Sheet 1
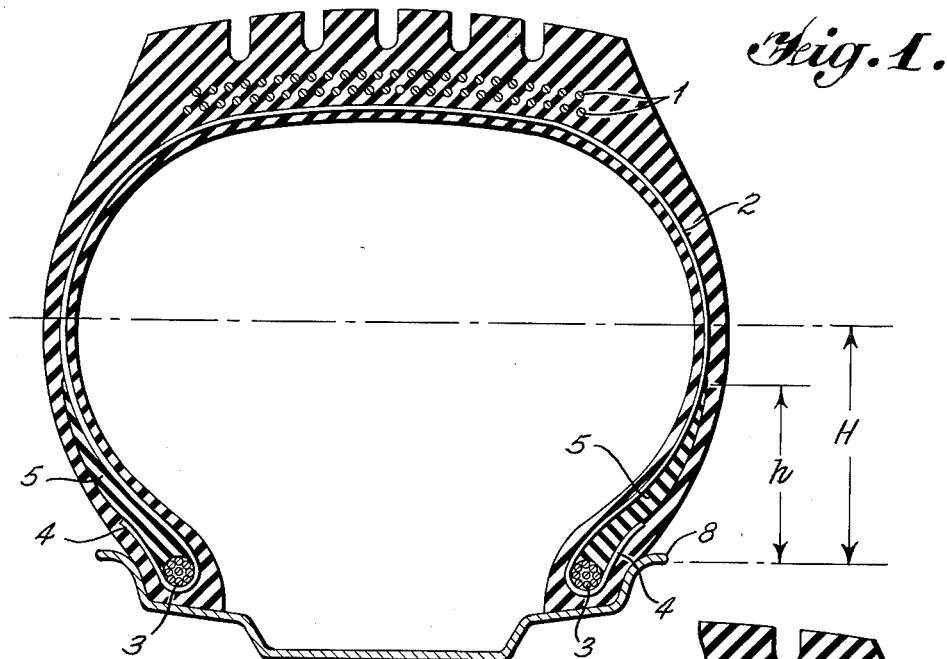
Fig. 1.
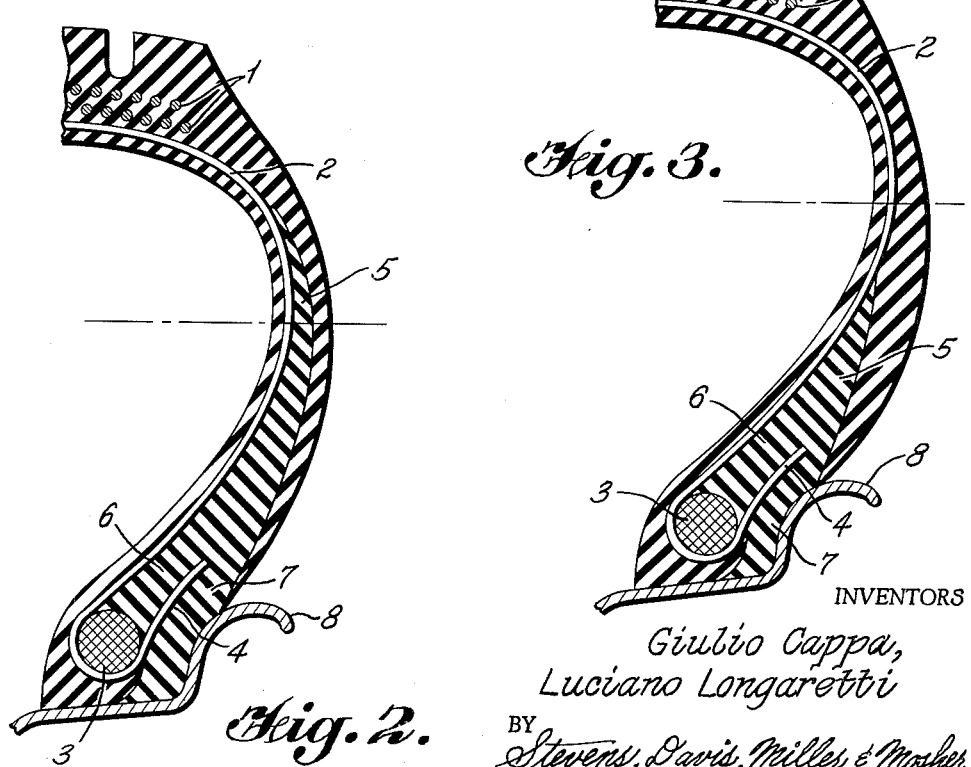
Fig. 2.
Fig. 3.
INVENTORS
Giulio Cappa,
Luciano Longaretti
BY Stevens, Davis, Miller & Mosher
ATTORNEYS INVENTORS
Giulio Cappa,
Luciano Longaretti United States Patent Office 3,232,331
Patented Feb. 1, 1966

3,232,331
BEADS OF PNEUMATIC TIRES FOR
VEHICLE WHEELS
Giulio Cappa and Luciano Longaretti, both of Milan,
Italy, assignors to Pirelli S.p.A., Milan, Italy
Filed May 1, 1964, Ser. No. 365,238
Claims priority, application Italy, Jan. 29, 1962,
1,703/62; May 13, 1963, 9,858/63
3 Claims. (Cl. 152—354)

This application is a continuation-in-part of Serial No. 251,587, filed January 15, 1963, and now abandoned. The present invention relates to pneumatic tires for vehicle wheels and more precisely to pneumatic tires provided with a so-called "radial" carcass; namely, a carcass having one or more plies or layers of cords extending in directions that are either contained in planes passing through the axis of rotation of the tire or form small angles relative to such planes.

The pneumatic tires provided with carcasses of this type are markedly deformable in a vertical direction under the action of the load, which has proved to be a highly desirable feature from the standpoint of travelling comfort. Nevertheless tires of such type are also deformable under the action of transversal forces thus having a negative effect on road hugging ability and also sometimes causing ruptures of the carcass at the end of the rim flange due to sudden variations of the state of rigidity between the rim and the tire.

In an attempt to solve those problems, it has been proposed to insert in the beads reinforcing structures of various types, generally constituted by one or more flippers which also wrap around the bead core and extend into the lower part of the sidewall; that is, the portion extending from the end of the rim flange to the zone in which the tire section is its maximum width. These arrangements, however, also have certain disadvantages. For example, insertion of the reinforcements, between the plies, tends to cause detachment between the latter. The detachment takes place along the edges of the reinforcements. Moreover, since such reinforcements under flexion are much more rigid than the plies surrounding them, the neutral axis of the entire structure passes through the reinforcements. Hence, when the tire is squeezed, as a result of deformations which take place in the lower portions of the sidewall in proximity of the rim flanges, the state of tension is increased in the innermost plies whereas in the outermost plies it is reduced or annulled. Accordingly, this can bring about a harmful state of compression of the cords since, as is known to those skilled in the art, the cords are unable to suffer compression stresses.

It is an object of the present invention to provide a pneumatic tire of the "radial carcass" type wherein the beads embody a reinforcement structure affording a practical solution to the present tires of that type insofar as the problems of lateral stability and resistance to ruptures of the carcass at the end of the rim flanges are concerned, but at the same time is devoid of the problems of detachment of the plies and a harmful state of compression of the cords of the plies.

Briefly summarized, the best means presently devised for solving the above described problems comprises a resilient tapering strip made of a rigid material such as a rubber compound or commercial plastics having a hardness in excess of 80° Shore, and preferably ranging from 90° to 95° Shore and extending from the bead towards the sidewall, outwardly with respect to the carcass plies, in effect constituting an extension of the rim flanges. In order to attain a variation of rigidity from the rim, which is not deformable, to the tire sidewall, which is highly deformable, as gradually as possible the resilient strip is more rigid than any other compound used in the tire and is tapered from the bead towards the sidewall.

The resilient tapering strip is generally positioned outside the carcass plies, extending along the radially inner surface of the sidewall in the direction of the tread to a point at least ⅓ of the height of the lower portion of said sidewall. The expression "lower portion of the sidewall" as used herein means the portion of the sidewall disposed between the end of the rim flange and the point in which the tire section has its maximum width. Accordingly, while the resilient strip may extend beyond the point of maximum width of the tire, in the preferred embodiment, it should extend as far as a zone situated at a point between one-half and the upper limit of the lower portion of the sidewall.

Also, in the preferred embodiment of the invention, all the carcass plies are turned up about the bead core in the same direction; that is they pass inwardly of the core and are then turned up towards the outside. (As used herein, the expression "inside the core" means "at the side of the core directed to the mid-circumferential plane.") The base of the resilient strip; namely, the portion nearest to the core, bears against the core itself thus being disposed between portions of the carcass plies and their return bent extremities.

In a modified form of the invention which has proved to be particularly advantageous, when all the plies are turned up outwardly, the base of the resilient strip is provided with a longitudinal slit dividing the base into two portions, the turned up portions of the plies being inserted in the slit. The two portions are disposed one between the plies and their turned up extremities and the other between the latter and the rim flange. This embodiment provides an efficient anchorage of the plies and minimizes the occurrence of fatigue breaks immediately over the rim flange.

In still another modified form of the invention, the resilient tapered strip may be disposed wholly outside the carcass and therefore outside the turned up extremities of the plies. This not only affords the transverse stiffening effect of the other forms, but it offers the advantages of a simple construction and the elimination of certain tire elements as will be explained more fully hereinafter.

In the accompanying drawings, illustrating the best means presently contemplated for utilizing the present invention:

FIG. 1 is a semi-diagrammatic cross sectional view of a pneumatic tire showing an embodiment of the invention;

FIG. 2 is a semi-diagrammatic fragmentary cross sectional view of another embodiment of the invention, on an enlarged scale;

FIG. 3 is a view like FIG. 2 of still another embodiment of the invention;

Figure 4:
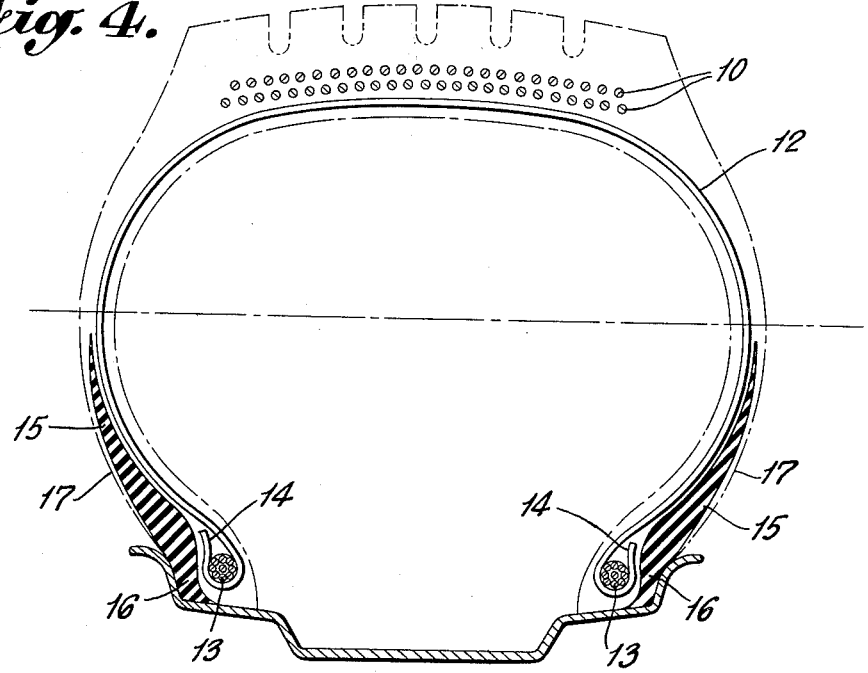
FIG. 4 is a view like FIG. 1 of a further embodiment of the invention.

FIG. 1 illustrates in cross section a pneumatic tire of the type provided with an annular inextensible reinforcement 1, disposed below the tread and having a radial carcass 2, which is shown diagrammatically as constituted by a single ply, but which may also be composed by several plies. All the plies extend downwardly and inwardly of the bead core 3 and are turned up outwardly to form the turn-ups or return bend portions 4. Between the plies and the turn-ups, with its base bearing against the bead core, there is a resilient strip 5, usually made of very hard rubber, the hardness of which is in excess of 80° Shore and preferably ranging between 90° and 95° Shore, and tapering in cross section along the sidewall.

In FIG. 1 the reference letter H indicates the lower portion of the sidewall and the letter $h$, the part of said portion along which the resilient strip 5 extends. In the illustrated example, the ratio $h/H$ is equal to 0.75.

FIG. 2 illustrates the sidewall of a pneumatic tire according to another embodiment of the invention wherein the resilient strip 5 extends beyond the point of maximum width of the tire; namely in the upper portion of the sidewall. The base of this strip is divided into two portions 6 and 7, the first of which is disposed between the plies of the carcass 2 and the turn-ups 4, whereas the second is disposed between the turn-ups 4 and the flange 8 of the rim.

FIG. 3 shows the sidewall of a pneumatic tire in accordance with a third embodiment of the invention. This embodiment differs from that shown in FIG. 2 with respect to the height of the resilient strip 5, which extends only in the lower portion of the sidewall, the ratio $h/H$, measured as indicated in FIG. 1, being also equal to 0.75.

FIG. 4 illustrates a pneumatic tire provided with an inextensible annular reinforcement 10 disposed below the tread and with a radial carcass 12, which in the figure is shown as having a single ply, but which may be constituted by several plies. The plies constituting the carcass 12 are wound about bead wires 13 to form the turn-ups 14. Outside the turn-ups 14 there are the resilient tapering strips 15. In the example of FIG. 4, the resilient tapering strips 15 each have an extension 16 which extends towards the base of the bead, and the rubber forming the sidewalls 17 does not reach the rim flange, so that the extensions 16 remain uncovered. Since the rubber constituting the resilient tapering strips 15 and their extensions 16 is very hard, it is possible to eliminate the chafers of fabric and the special rubber strips which would be otherwise necessary to protect the plies in the zone in which the beads come into contact with the rim flange.

Figure 5:
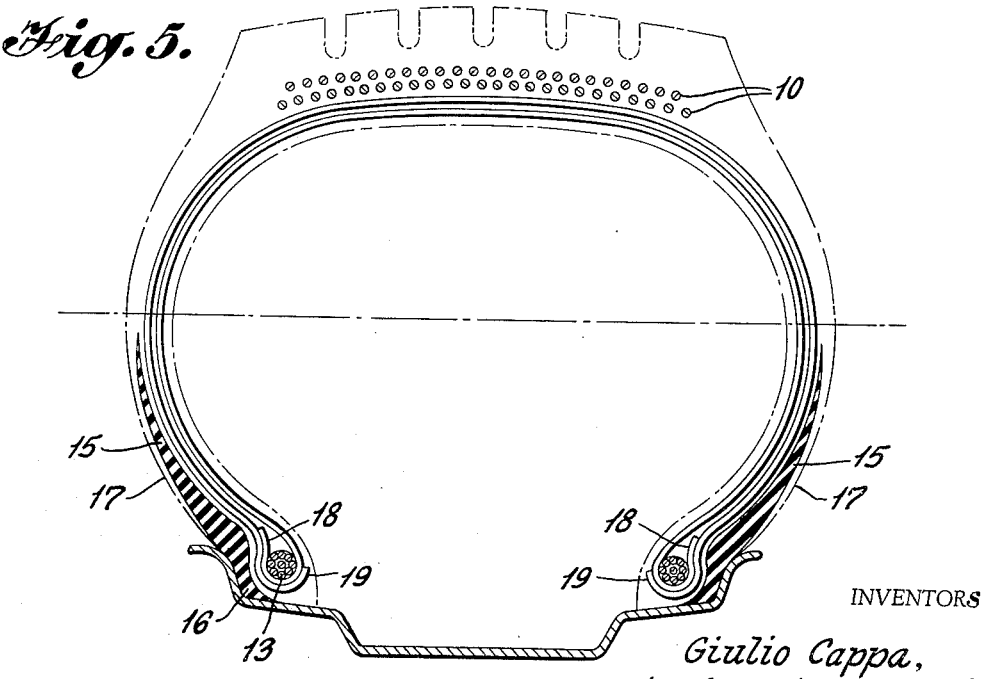
FIG. 5 is a similar view of a still further embodiment of the invention.

Moreover, the forms of hard resilient strip shown in FIGS. 4 and 5, have an advantage over the forms of FIGS. 1, 2 and 3 in that they facilitate the construction of pneumatic tires since they eliminate the need for a special resilient tapering strip between the plies and their turn-ups, and this in turn permits the use of conventional building-up machines without the need of any modification.

In the embodiment shown in FIG. 5 the tire is provided with a radial carcass having several plies, a part of which is turned up outwardly, forming turn-ups 18, while another part is turned up inwardly, forming turn-ups 19. Outside the carcass, there are provided the resilient tapering strips 15.

It is understood that the above indicated embodiments are given only by way of non-limiting example, any other alternative or embodiment deriving from the above stated inventive principle being included in the scope of the present invention.

What is claimed is:
1. A pneumatic tire for vehicle wheels provided with resilient strips each disposed in a bead having a bead core, each strip tapering in cross section towards the tread of the tire with its maximum cross section in close proximity radially outwardly of said bead core, the portion of each said strip of maximum cross section being adjacent a rim flange of an associated wheel, said strips being outside the carcass plies of said tire and between the rubber of the sidewall and said carcass plies, said strips being composed of a material having a hardness greater than the hardness of any other rubber compound used in the tire, and characterized in that the extremities of all said carcass plies are passed inwardly of said bead core and are then turned up outwardly of said bead core, said resilient strips having their bases bearing against the adjacent bead core and disposed between the carcass plies and the turned up portions.

2. A pneumatic tire for vehicle wheels provided with resilient strips each disposed in a bead having a bead core, each strip tapering in cross section towards the tread of the tire with its maximum cross section in close proximity radially outwardly of said bead core, the portion of each said strip of maximum cross section being adjacent a rim flange of an associated wheel, said strips being outside the carcass plies of said tire and between the rubber of the sidewall and said carcass plies, said strips being composed of a material having a hardness greater than the hardness of any other rubber compound used in the tire, and characterized in that the extremities of all said carcass plies are passed inwardly of said bead core and are then turned up outwardly of said bead core, said resilient strips having their bases divided into two portions by a longitudinal slit into which the turned up portions of the carcass plies are inserted.

3. A pneumatic tire for vehicle wheels provided with resilient strips each disposed in a bead having a bead core, each strip tapering in cross section towards the tread of the tire with its maximum cross section in close proximity radially outwardly of said bead core, the portion of each said strip of maximum cross section being adjacent a rim flange of an associated wheel, said strips being outside the carcass plies of said tire and between the rubber of the sidewall and said carcass plies, said strips being composed of a material having a hardness greater than the hardness of any other rubber compound used in the tire, said resilient strips each having a portion extending to the base of the bead.

References Cited by the Examiner
UNITED STATES PATENTS

| 3,050,098 | 8/1962 | Grote | 152—354 |
| 3,052,275 | 9/1962 | Hylbert | 152—362 X |

ARTHUR L. LA POINT, *Primary Examiner.*